(12) United States Patent
Miichi et al.

(10) Patent No.: US 9,671,935 B2
(45) Date of Patent: Jun. 6, 2017

(54) INFORMATION DISPLAY DEVICE, DISPLAY MODE SWITCHING METHOD AND DISPLAY MODE SWITCHING PROGRAM

(75) Inventors: Tadahiro Miichi, Nishinomiya (JP); Tatsuya Asahara, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 289 days.

(21) Appl. No.: 14/379,274

(22) PCT Filed: Feb. 16, 2012

(86) PCT No.: PCT/JP2012/001011
§ 371 (c)(1),
(2), (4) Date: Aug. 15, 2014

(87) PCT Pub. No.: WO2013/121459
PCT Pub. Date: Aug. 22, 2013

(65) Prior Publication Data
US 2015/0033176 A1    Jan. 29, 2015

(51) Int. Cl.
*G06F 3/0484* (2013.01)
*G09B 29/10* (2006.01)
(Continued)

(52) U.S. Cl.
CPC ....... *G06F 3/0484* (2013.01); *G01C 21/3664* (2013.01); *G06F 3/0488* (2013.01);
(Continued)

(58) Field of Classification Search
CPC .............................. G06F 3/0484; G06F 3/0481
See application file for complete search history.

(56) References Cited

U.S. PATENT DOCUMENTS

2008/0165255 A1* 7/2008 Christie .............. G06F 3/04883
348/207.99
2010/0115455 A1* 5/2010 Kim .................... G06F 3/04815
715/781
(Continued)

FOREIGN PATENT DOCUMENTS

CN    101763194 A    6/2010
CN    101769760 A    7/2010
(Continued)

OTHER PUBLICATIONS

Google Maps—Jul. 21, 2011.*
Japanese Patent Office, International Search Report of PCT/JP2012/001011, Mar. 27, 2012, 1 page.

*Primary Examiner* — David Choi
(74) *Attorney, Agent, or Firm* — Alleman Hall McCoy Russell & Tuttle LLP (57) ABSTRACT

A touch panel device includes a display unit, a detector, and a controller. The display unit displays, on a display screen, a nautical chart (map), and a touch panel device symbol indicating a position of the ship on the nautical chart. The detector detects rotating operation that is touch operation of rotating around the touch panel device symbol over a predetermined angle while touching the touch panel device symbol. When the detector detects the rotating operation, the controller switches a display mode to a different display mode in which a reference azimuth defining a displaying orientation of the nautical chart is different.

18 Claims, 10 Drawing Sheets

(51) Int. Cl.
*G09B 29/00* (2006.01)
*G01C 21/36* (2006.01)
*G06F 3/0488* (2013.01)
*B63B 49/00* (2006.01)

(52) U.S. Cl.
CPC ........... *G09B 29/007* (2013.01); *G09B 29/10* (2013.01); *B63B 49/00* (2013.01); *G01C 21/367* (2013.01)

(56) References Cited

U.S. PATENT DOCUMENTS

| | | | | |
|---|---|---|---|---|
| 2010/0123737 | A1* | 5/2010 | Williamson | G01C 21/3647 345/672 |
| 2011/0102464 | A1* | 5/2011 | Godavari | G06F 3/0416 345/650 |
| 2011/0175928 | A1* | 7/2011 | Hashimoto | G01C 21/3682 345/629 |
| 2011/0205147 | A1* | 8/2011 | Wilson | G06F 3/017 345/156 |
| 2012/0068950 | A1* | 3/2012 | Conde | G06F 3/04847 345/173 |
| 2013/0169579 | A1* | 7/2013 | Havnor | G06F 3/04883 345/173 |
| 2014/0245217 | A1* | 8/2014 | Asahara | G06F 3/04845 715/781 |
| 2015/0033176 | A1* | 1/2015 | Miichi | G09B 29/007 715/771 |

FOREIGN PATENT DOCUMENTS

| | | |
|---|---|---|
| CN | 102096529 A | 6/2011 |
| CN | 102323875 A | 1/2012 |
| CN | 102331903 A | 1/2012 |
| JP | 200420981 A | 1/2004 |

* cited by examiner

INFORMATION DISPLAY DEVICE, DISPLAY MODE SWITCHING METHOD AND DISPLAY MODE SWITCHING PROGRAM

TECHNICAL FIELD

The present invention mainly relates to an information display device, which has a touch panel and displays a location of the information display device on a map.

BACKGROUND ART

Conventionally, information display devices (navigation devices) installed in movable bodies, such as vehicles and ships, and for displaying locations of the movable bodies have been known. Patent Document 1 discloses an information display device of such kind, specifically, a display device for displaying a location of the ship on a nautical chart.

Moreover, in Patent Document 1, regarding display modes defining a displaying orientation of the nautical chart, north up, head up (heading up), and course up are disclosed. North up is a display mode in which the north direction is an upward direction of a display screen. Head up is a display mode in which a direction to which the information display device is oriented is the upward direction of the display screen. Course up is a display mode in which a direction of a set course is the upward direction of the display screen.

In Patent Document 1, the method of switching among these display modes is not described. Generally, a method of pressing a menu button or the like to call a menu screen, selecting a menu item, such as display setting, and selecting a desired display mode is adopted.

REFERENCE DOCUMENTS OF CONVENTIONAL ART

Patent Document(s)

Patent Document 1: JP2004-020981A

DISCLOSURE OF THE INVENTION

Problems to be Solved by the Invention

As described above, a plurality of operations are required to switch the display mode, and when often switching the display mode, there has been a case where the operations are troublesome. Moreover, during the operations, the display screen is covered by the menu screen, and therefore, visibility degrades, even temporarily.

Moreover, in a case where the information display device has a touch panel, since instinctive operation is required, it is preferred that the display mode is switchable by touch operation (touch gesture). Since the map rotates when changing the display mode, for example, it can be considered that the display mode can be changed instinctively by using touch operation of touching two positions on the display screen and drawing, around one of the touching fingers, an arc with the other finger.

However, since this touch operation is similar to pinch operation (operation of elongating or narrowing a distance between the two touched positions) which is frequently used in displaying the map, a situation is considered that causes confusion and degrades operability.

The present invention is made in view of the above situations and aims to provide an information display device, which can change a display mode by operation that is instinctive and difficult to be falsely recognized as pinch operation.

SUMMARY AND EFFECT(S) OF THE INVENTION

Problems to be solved by the present invention are described above, and means for solving the problems and effects thereof will be described below.

According to a first aspect of the present invention, an information display device with the following configuration is provided. That is, the information display device includes a display unit, a touch detector, and a controller. The display unit displays, on a display screen, a map and an information display device symbol indicating a position of the information display device on the map, the information display device being a movable body. The touch detector detects rotating operation and pinch operation, the rotating operation being touch operation in which a position of one of a touch on the information display device symbol and a touch on other than the information display device symbol is rotated centering on a position of the other touch over a predetermined angle without changing the position of the other touch, the pinch operation being touch operation in which at least one of the two touches on the display screen is separated from or brought closer to the other touch. The controller, when the touch detector detects the rotating operation, switches a display mode to a different display mode in which a reference azimuth defining a displaying orientation of the map is different, and, when the touch on the information display device symbol is detected, does not perform processing that is associated with the pinch operation even in a case where the touch detector detects the pinch operation.

Thereby, the display mode can be switched by instinctive and simple operation. Moreover, since the display mode is switchable only when the information display device symbol is touched, the rotating operation can be clearly discriminated from other touch operations (e.g., the pinch operation). Therefore, the information display device that can change the display mode by the instinctive touch operation while validating the touch operation that is often used, such as the pinch operation, can be achieved.

In the information display device, when the touch detector detects the rotating operation, the controller preferably switches to the different display mode by rotating the map in the same direction as a rotating direction of the rotating operation.

Thereby, it becomes easy to grasp how the orientation of the map changes, compared to a configuration in which the display mode is switched instantly. Moreover, by matching the rotating direction of the rotating operation with the rotating direction of the map, a comfortable operational feeling can be achieved.

In the information display device, the controller preferably switches to the different display mode by rotating the map centering on the position of the information display device symbol.

Thereby, it can be prevented that the information display device symbol is positioned outside of the display screen after switching the display mode.

In the information display device, the controller preferably switches to the different display mode by rotating the map centering on a center part of the display screen.

Specifically, when the information display device symbol is used as the rotational center and is positioned in an end part of the display screen, the content displayed on the display screen changes drastically. On the other hand, by using when the center part of the display screen as the rotational center, it can be prevented that an area displayed on the display screen changes drastically between before and after the switching of the display mode.

In the information display device, when the information display device symbol is touched, the controller preferably displays a rotational center of the map used when switching to the different display mode.

Thereby, an operator can estimate an image to be displayed after the switching of the display mode to some extent. Moreover, by the rotational center being displayed, the operator can be informed that the operation to switch the display mode is acceptable.

In the information display device, the display mode preferably includes at least one of north up in which the north direction is an upward direction of the display screen, head up in which a direction to which the information display device is oriented is the upward direction of the display screen, course up in which a direction of a set course is the upward direction of the display screen, and a fixed point mode in which a direction set in advance is the upward direction of the display screen.

Thereby, the effect of the present invention can be exerted by using display modes that are normally used in car navigation devices and ship/aircraft navigation devices.

In the information display device, the rotating operation may be the touch operation in which while the information display device symbol is touched, the position of the touch on other than the information display device symbol is rotated centering on the information display device symbol over the predetermined angle, or the rotating operation may be the touch operation in which while other than the information display device symbol is touched, the position of the touch on the information display device symbol is rotated centering on the position of the touch on other than the information display device symbol over the predetermined angle.

According to a second aspect of the present invention, an information display device is provided, which has a configuration without a limitation regarding the touch detector being able to detect the pinch operation in the above aspect of the invention. Note that, the information display device can have a configuration including the features described above (limitation in the rotating direction or the rotational center, etc.). Moreover, the information display device can be an information display device (plotter device) having a configuration in which the movable body is a ship and a position of the ship is displayed on a nautical chart.

According to fourth and fifth aspects of the present invention, method and program of switching a display mode which does not have a limitation regarding the touch detector being able to detect the pinch operation in the above aspect of the invention are provided.

MODE(S) FOR CARRYING OUT THE INVENTION

Figure 1:
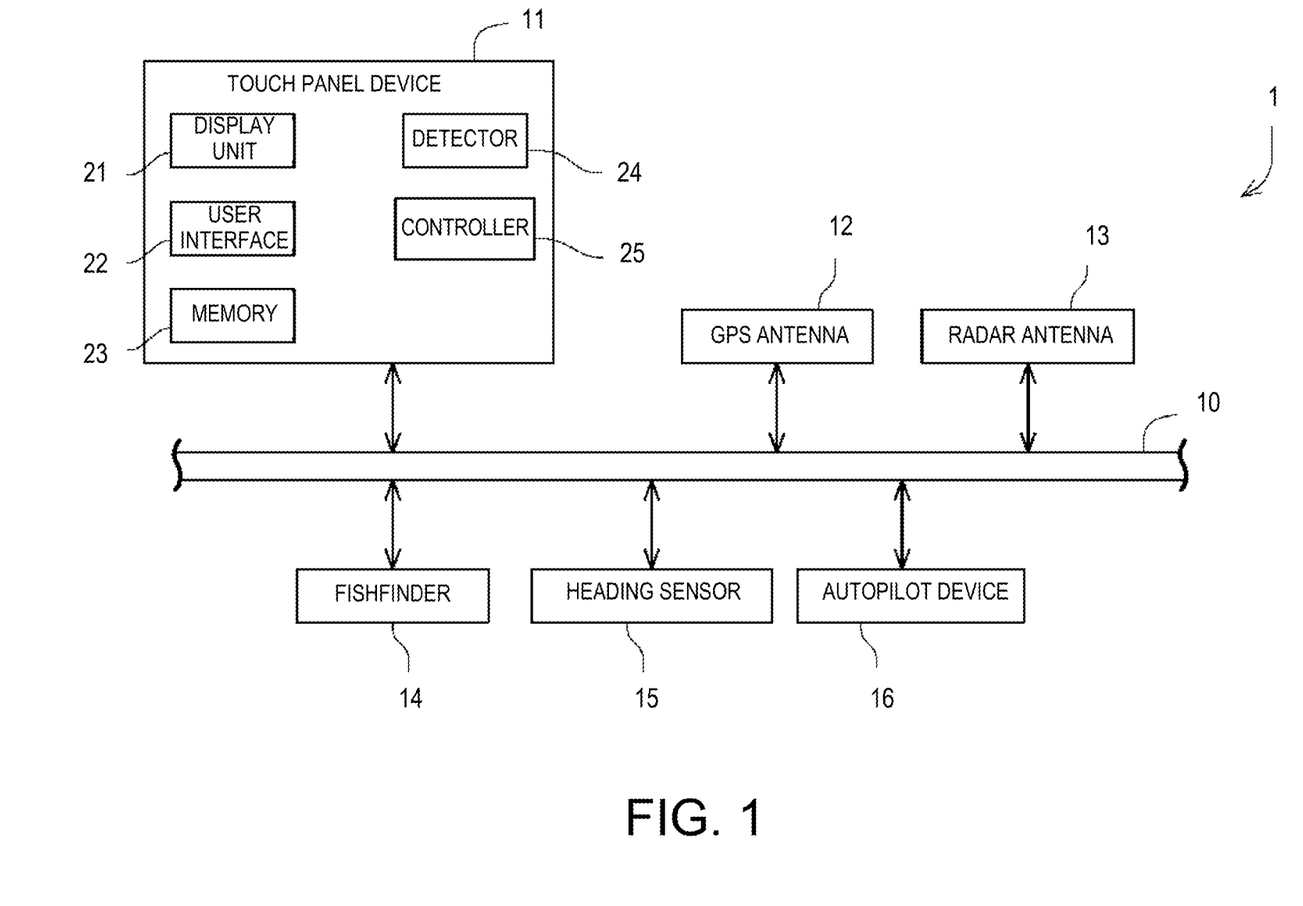
FIG. 1 is a block diagram illustrating an overall configuration of a ship instrument network system.
Figure 2:
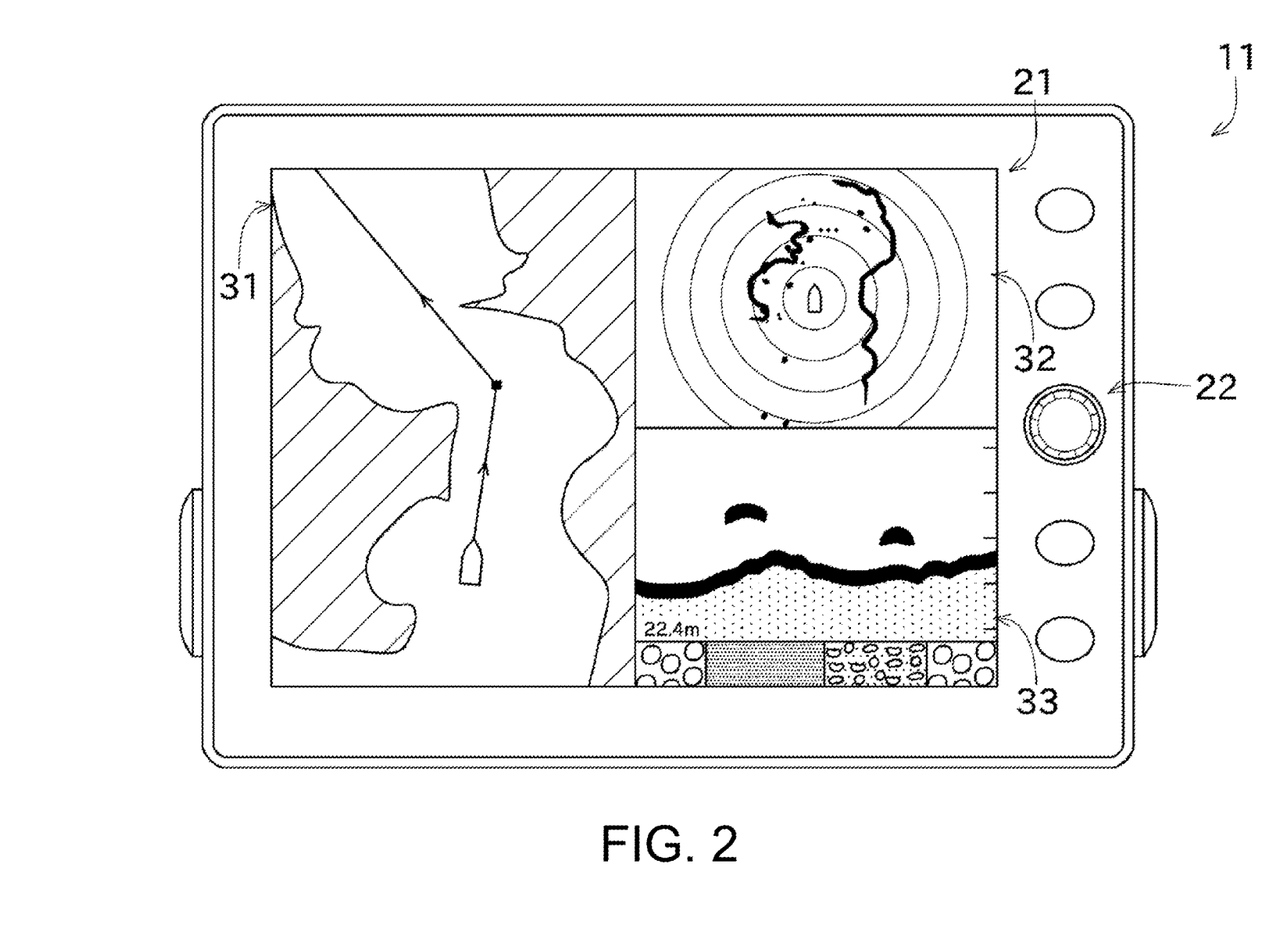
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device (information display device) 11.

The ship instrument network system 1 of this embodiment includes a plurality of ship instruments connected to a ship network 10. The ship instruments can exchange, for example, detected information via the ship network 10. As the standard of the ship network 10, LAN (Local Area Network) or CAN (Controller Area Network) can be adopted, for example.

As illustrated in FIG. 1, the ship instrument network system 1 of this embodiment includes a touch panel device (hereinafter, simply be referred to as the touch panel device) 11, a GPS antenna (GNSS sensor) 12, a radar antenna 13, a fishfinder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a user interface 22, a memory 23, a detector 24, and a controller 25.

The display unit 21 is comprised of, for example, a liquid crystal display, and can display the sensor image, various setting screens and the like on the display screen as described above.

The user interface 22 is comprised of, for example, a rotary key to which a clockwise or counterclockwise rotational operation can be performed, and a hardware key, such as a menu key or the like for calling out a menu screen. Note that, with the touch panel device 11, input and instruction can be performed by touch operation on the display screen. Therefore, the number of keys of the user interface 22 can be reduced.

The memory 23 stores, for example, contents of program(s) to be executed by the controller 25, nautical chart information, and navigation route(s) set by an operator.

The detector (touch detector) 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (change of the touched position) can be detected. Moreover, when two or more positions are touched simultaneously, the detector 24 can also detect the respective touched positions and changes of the respective touched positions. The touched position(s) and the change(s) of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation performed by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying the plurality of sensor images thereon (divided screen mode, see FIG. 2).

Moreover, the controller 25 performs matching between the change of the touched position detected by the detector 24 and predetermined touch operation contents (touch gestures which touch gesture is performed by the operator. Then, the controller 25 performs processing corresponding to the identified touch gesture.

One specific example of the touch gestures includes a "drag operation." The drag operation is a touch gesture of moving a touching finger (normally one finger) on the display screen to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11, may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing the ship location which changes with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fishfinder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fishfinder and data of the school of fish or the sea bottom) based on the reflection wave. Moreover, the fishfinder 14 of this embodiment has a function to determine a state of the sea bottom (bottom sediment type) based on the acquired fish finding data. Specifically, the analyzer can determine which kind the sea bottom falls in with higher possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading sensor 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Figure 3:
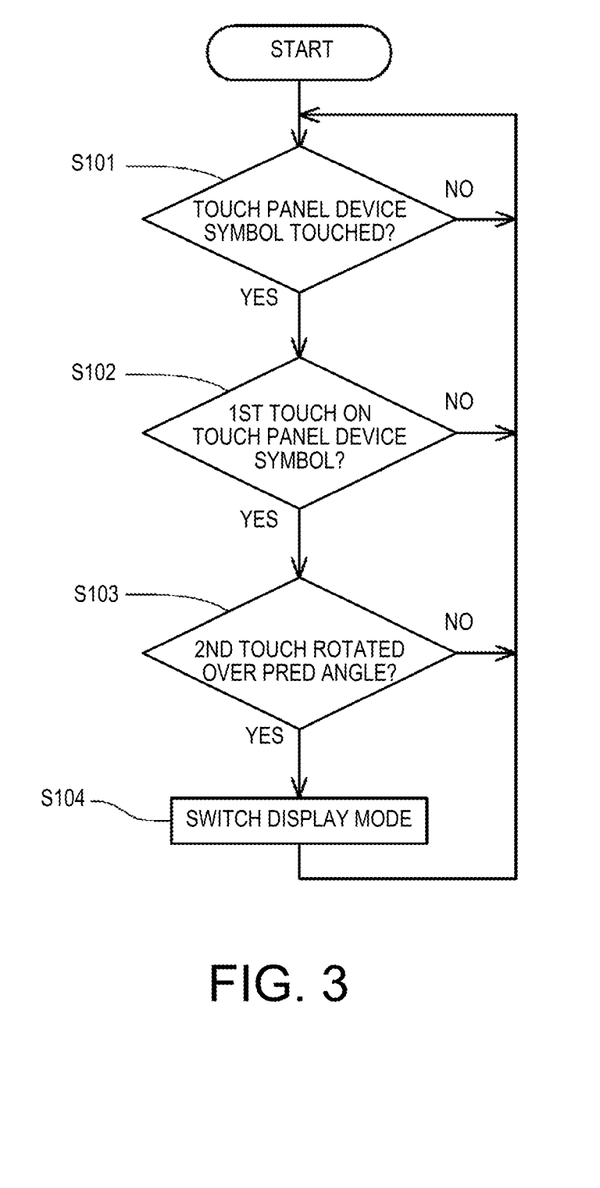
FIG. 3 is a flowchart for determining whether to change a display mode.

Next, a method of switching the display mode in the first sensor image 31 in which the nautical chart and the ship location are displayed is described with reference to FIGS. 3 to 8. FIG. 3 is a flowchart for determining whether to change the display mode. FIGS. 4 to 8 are views illustrating situations of the display screen when the display mode is changed by rotating operation. Note that, in this embodiment, the simple reference to "the display mode" indicates "the display mode defining the displaying orientation (reference azimuth) of a chart."

Note that, in the specification, "the map" indicates views of a part of or the entire earth (earth's surface) in a scaled down manner, and does not only indicate views in which lands are mainly depicted. Therefore, "the map" in the specification also includes, for example, aerial charts in which information for navigating aircrafts, and nautical charts in which information for navigating ships.

First, the first sensor image 31 displayed by the touch panel device 11 is briefly described. The memory 23 of the touch panel device 11 stores the nautical chart information as described above. The controller 25 can display the nautical chart and the location of the touch panel device (the ship) on the nautical chart, based on the nautical chart information.

Figure 4:
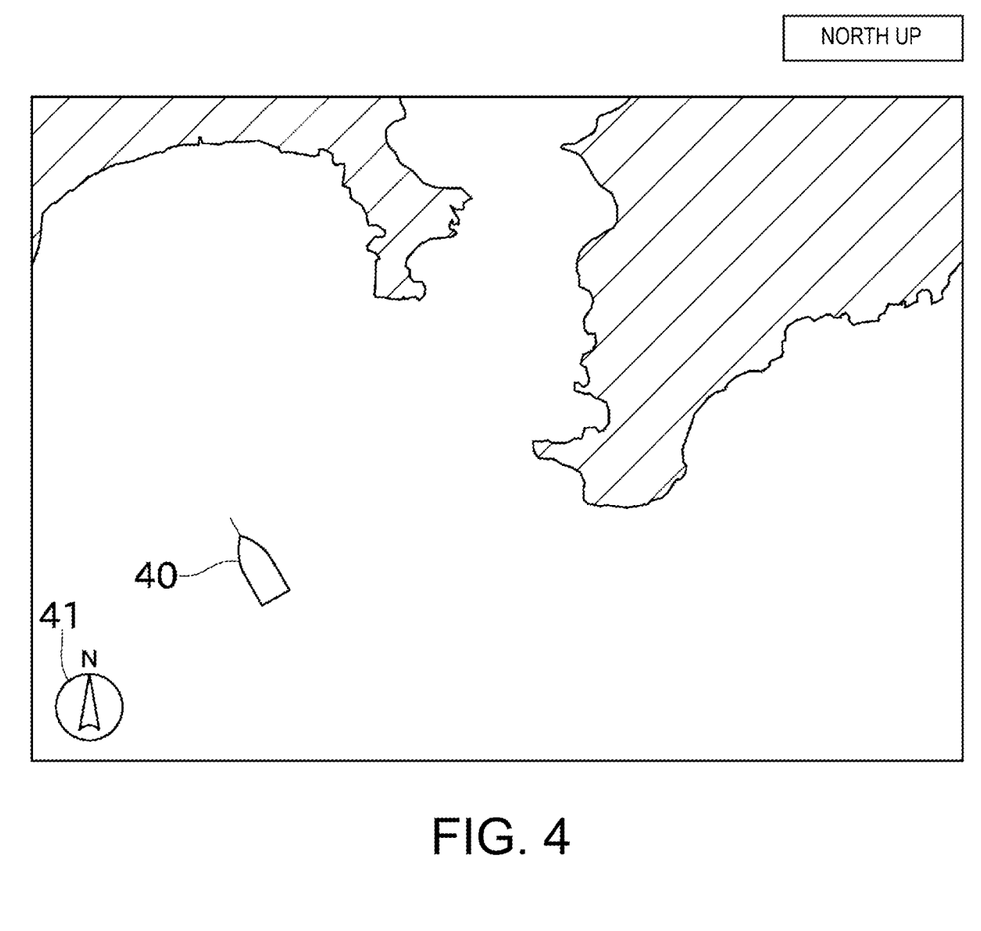
FIG. 4 is a view illustrating the display screen when the display mode is north up.

FIG. 4 is the view illustrating the display screen displaying the first sensor image 31. In FIG. 4, the nautical chart, a touch panel device symbol 40 indicating the location of the touch panel device (the ship), and a compass part 41 indicating the azimuth (absolute azimuth) are displayed. Moreover, in FIG. 4 and the drawings thereafter, shaded parts indicate lands, and parts other than those indicate the sea.

Next, a method of switching the display mode is described. The touch panel device 11 of this embodiment displays the nautical chart and the ship in one of the display modes of north up and heading up described above. Moreover, the touch panel device 11 switches from one of the display modes to the other display mode when it detects touch operation (rotating operation described later in detail) in which while the touch panel device symbol 40 is touched, a touched position other than the touch panel device symbol 40 is rotated over a predetermined angle centering on the touch panel device symbol 40.

Specifically, the touch panel device 11 determines whether the rotating operation is performed by the operator, based on the flowchart in FIG. 3. Hereinafter, the determination performed by the touch panel device 11 is described with reference to FIG. 3. Note that, the flowchart in FIG. 3 is one example, and a different method may be used as long as the determination whether the rotating operation is performed by the operator can be performed.

First, the touch panel device 11 determines whether the touch panel device symbol 40 is touched (S101). Then, when the touch panel device symbol 40 is touched, the touch panel device 11 determines whether the touch on the touch panel device symbol 40 is a first touch (S102).

Here, the first touch includes, not only a touch newly detected in a situation where the touch on the display screen is not detected at all, but also, when one of two touches is separated, the remaining touch. Therefore, when the operator touches with two fingers and removes one of the fingers, the touch by the remaining finger corresponds to the first touch. Thus, for example, even when the ship rocks greatly and the touch on the touch panel device symbol 40 is difficult, the operator touches near the touch panel device symbol 40 with an index finger or the like first, touches the touch panel device symbol 40 with a thumb or the like while pressing the index finger against the display screen to prevent the hand from shaking, and then removes the index finger from the display screen, so that the touch panel device symbol 40 can surely be touched.

Next, the touch panel device 11 determines whether the second touch has rotated over the predetermined angle centering on the first touch described above (whether θ in FIG. 6 described later is over the predetermined angle) (S103). Then, if the touch panel device 11 determines that it has rotated over the predetermined angle, the touch panel device 11 rotates the nautical chart to switch the display mode as needed (S104). The touch panel device 11 determines whether to switch the display mode, as described above.

Note that, the touch panel device 11 also determines whether the pinch operation is performed, and it scales up the nautical chart if the pinch out operation is performed, and it scales down the nautical chart if the pinch in operation is performed. However, when one of the two touches of the pinch operation is on the touch panel device symbol 40, the touch panel device 11 does not scale up/down even when the pinch operation is performed. Thus, it can be prevented that the nautical chart is scaled up/down when the rotating operation is performed by the operator.

Next, a flow and a change of the display screen when the operator performs the rotating operation to switch the display mode of the touch panel device 11 from north up to heading up are described. FIG. 4 illustrates the first sensor image 31 when the display mode is north up. When the display mode is north up, the displaying orientation of the nautical chart is controlled so that the north direction is always the upper side of the display screen.

Figure 5:
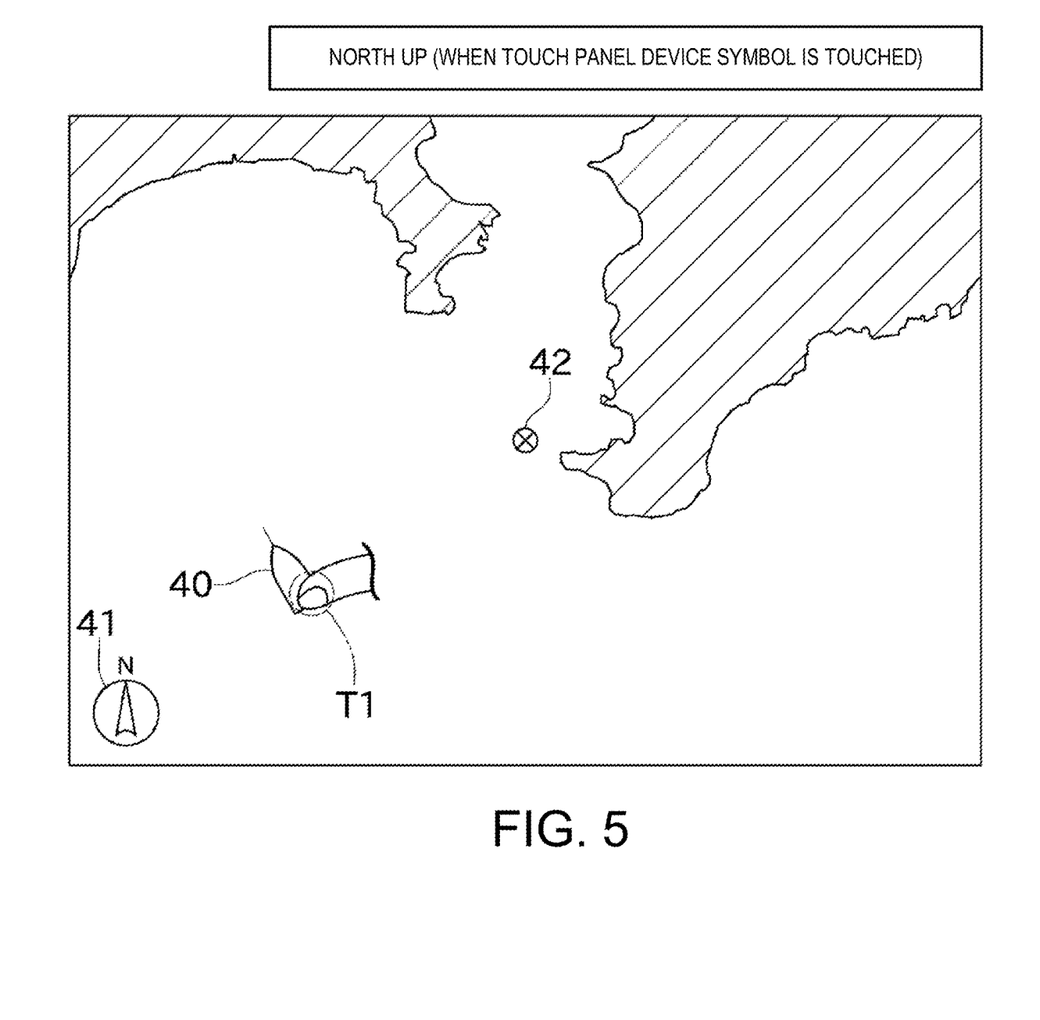
FIG. 5 is a view illustrating the display screen when a touch panel device symbol is touched.
Figure 6:
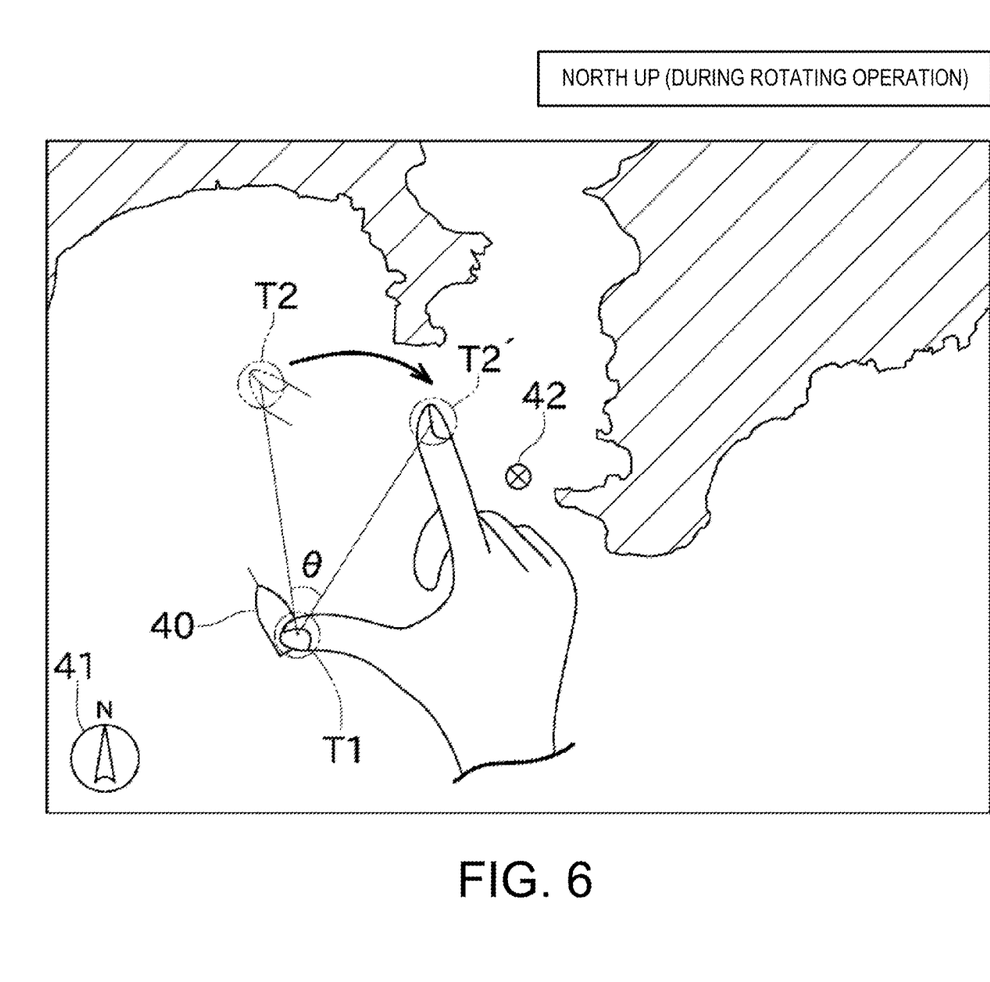
FIG. 6 is a view for describing rotating operation.

When the operator switches the display mode from north up to heading up, first the touch panel device symbol 40 is touched by the thumb (see the reference mark T1 in FIG. 5). Moreover, by touching the touch panel device symbol 40, a rotational center symbol 42 appears on the display screen. The rotational center symbol 42 is a symbol displaying the rotational center of the nautical chart when switching to the other display mode (heading up). In this embodiment, a center part of the display screen is set to be the rotational center, and therefore, the rotational center symbol 42 is displayed in the center part of the display screen. The operator can estimate how the nautical chart rotates to switch the display mode, by referring to the rotational center symbol 42.

Figure 7:
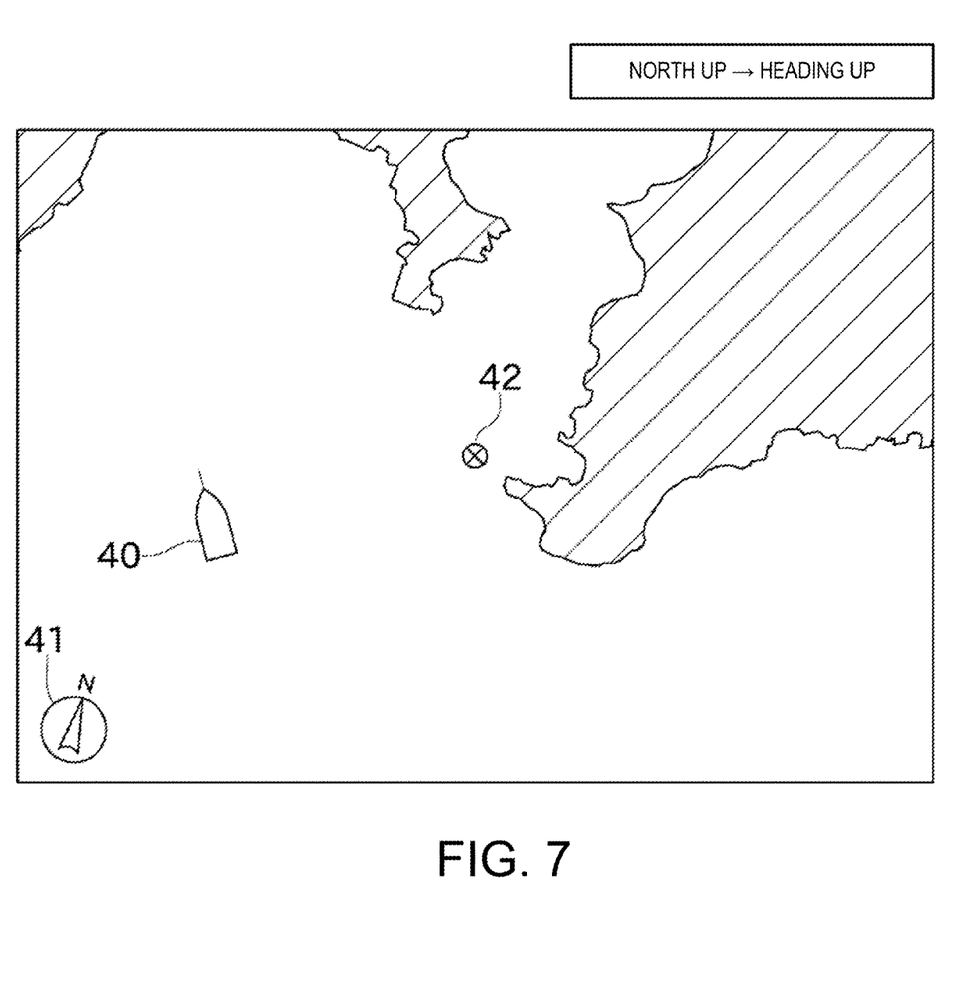
FIG. 7 is a view illustrating the display screen while switching from north up into heading up.
Figure 8:
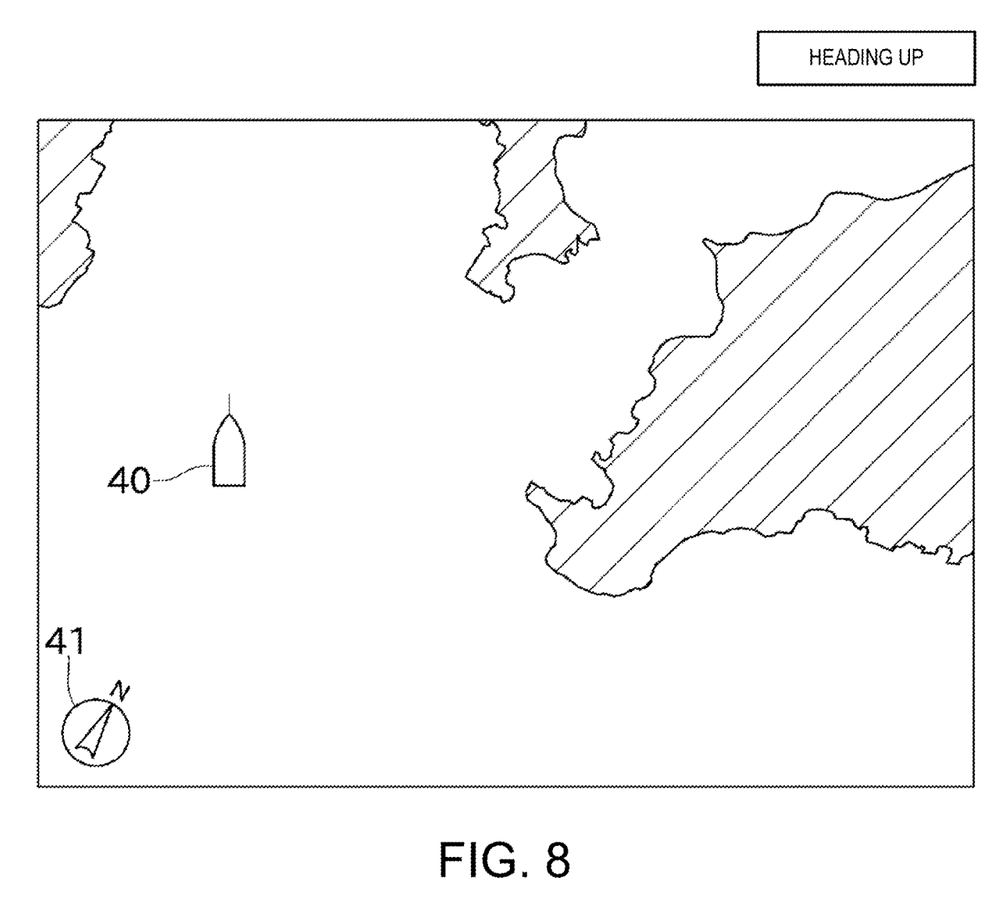
FIG. 8 is a view illustrating the display screen after switching into heading up.

Next, the operator touches the display screen with the index finger or the like (the second touch, see the reference mark T2 in FIG. 6) while keeping the touch by the thumb (the first touch). Then, the operator performs operation in which the index finger draws an arc centering on the touch by the thumb, without removing the thumb and the index fingers. When the rotation angle θ of the arc drawn here is larger than the predetermined angle, the touch panel device 11 switches the display mode from north up into heading up (FIGS. 7 and 8).

In this embodiment, when switching the display mode, the display mode is switched through rotating the nautical chart and not instantly switched. Moreover, the rotating direction of the nautical chart is the same as the direction in which the operator rotates. Specifically, in this embodiment, the direction in which the operator rotates is clockwise (see FIG. 6), and therefore, the rotation of the nautical chart is also performed clockwise (see FIG. 7 illustrating the display screen during the switch). By determining the direction of rotating the nautical chart as described above, the operation by the operator is associated with the movement of the display screen, and thus a comfortable operational feeling can be achieved.

As described above, the display mode can be switched from north up into heading up. In heading up illustrated in FIG. 8, the displaying orientation of the nautical chart is controlled so that the touch panel device is always oriented upwardly on the display screen. Therefore, when the touch panel device turns, the nautical chart rotates, following the touch panel device.

As described above, the touch panel device 11 includes the display unit 21, the detector 24, and the controller 25. The display unit 21 displays the nautical chart (map), and the touch panel device symbol 40 indicating the ship location on the nautical chart. The detector 24 detects the rotating operation which is the touch operation of rotating around the touch panel device symbol 40 over the predetermined angle while touching the touch panel device symbol 40. When the detector 24 detects the rotating operation, the controller 25 switches the display mode to the other display mode in which the reference azimuth determining the displaying orientation of the nautical chart is different.

Thus, the display mode can be switched by the instinctive and simple operation. Moreover, since the display mode is switchable only when the touch panel device symbol 40 is touched, the rotating operation can be clearly discriminated from other touch operations (e.g., the pinch operation). Therefore, the information display device that can change the display mode by the rotating operation instinctively while validating the touch operation that is often used, such as the pinch operation, can be achieved.

Figure 9A:
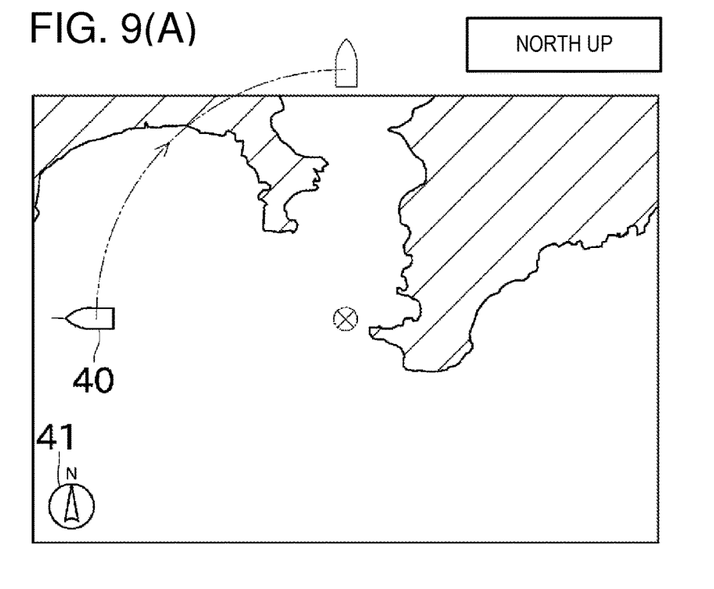
FIGS. 9(a) and 9(b) show views illustrating the display screen when rotating a nautical chart centering on the touch panel device symbol while switching the display mode.
Figure 9B:
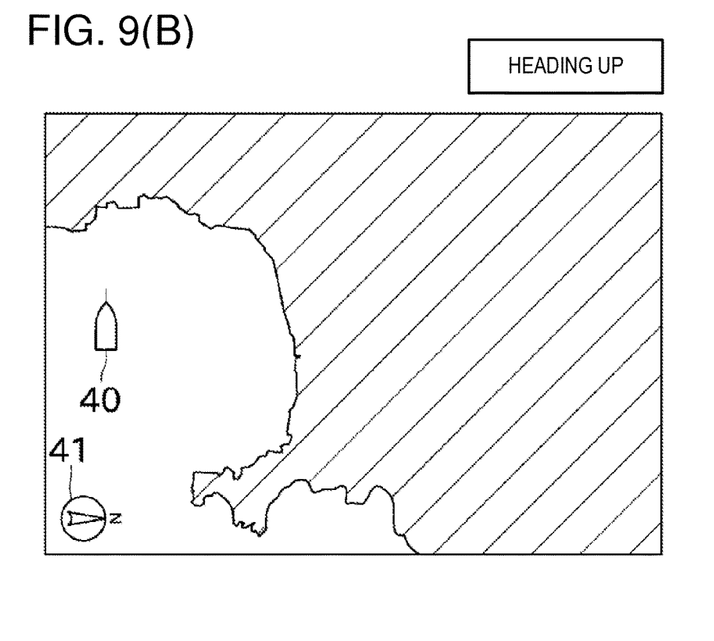

Next, the case where the touch panel device symbol 40 is positioned outside of the display screen as a result of switching the display mode is described with reference to FIGS. 9(*a*) and 9(*b*). FIGS. 9(*a*) and 9(*b*) show views illustrating the display screen when rotating the nautical chart centering on the touch panel device symbol 40 while switching the display mode.

When the display mode is switched by having the center part of the display screen as the rotational center of the nautical chart in the situation of the part (A) of FIG. 9, as indicated by the chain line in the drawing, the touch panel device symbol 40 is positioned outside of the display screen. Therefore, in this embodiment, when the touch panel device 11 detects the situation in which the touch panel device symbol 40 is positioned outside of the display screen after the display mode is switched, it sets the rotational center of the nautical chart to the touch panel device symbol 40 instead of the center part of the display screen.

Thus, as illustrated in the part (B) of FIG. 9, it can be prevented that the touch panel device symbol 40 is positioned outside of the display screen. Note that, to prevent the situation that the touch panel device symbol 40 is positioned outside of the display screen, a configuration for changing the scale after switching the display mode or a configuration for scrolling the nautical chart may be adopted.

Note that, the touch panel device 11 also switches the display mode when the compass part 41 is touched. Hereinafter, three advantages in providing the configuration of the present application (the change of the display mode by the touch operation), in addition to the configuration for also switching the display mode when the compass part 41 is touched, are described.

The first advantage is that the display mode can be switched at various positions on the display screen (not at ends of the display screen but also at the position of the touch panel device symbol 40) by providing both of the configurations. The second advantage is that the display mode can be switched even when the compass part 41 is not displayed. The third advantage is that the use interface improves because the touch on the compass part 41 and the rotating operation can be separately used according to the liking of the operator, the usage and the like.

Although the preferred embodiment of the present invention is described above, the above configuration may be modified as follows, for example.

In the above embodiment, the operation in which the other touched position is rotated centering on the touch panel device symbol 40 is the rotating operation; however, alternatively, touch operation in which the position of the touch on the touch panel device symbol 40 (second touch) is rotated centering on a touched position other than the touch panel device symbol 40 (first touch) over a predetermined angle while keeping the touched position other than the touch panel device symbol 40, may be the rotating operation. In this case, when a position other than the touch panel device symbol 40 is touched as the second touch, the display mode does not switch. Therefore, even when this rotating operation is adopted, similar to the above embodiment, the effect that it is not easily falsely recognized as the other touch operation can be exerted.

In this configuration and the above embodiment, instead of rotating the second touch centering on the first touch, operation of rotating the first touch centering the second touch may be the rotating operation.

In the above embodiment, only when it is detected that the touch panel device symbol 40 is positioned outside of the display screen after switching the display mode, the nautical chart is rotated by having the touch panel device symbol 40 as the rotation center; however, the touch panel device symbol 40 may always be the rotation center. Moreover, a configuration in which the operator can specify the rotation center in advance or a configuration in which the rotation center can be set individually according to the display mode after the switch may be adopted. For example, since the location of the touch panel device is important in many cases in the heading up state, when switching to heading up, the touch panel device symbol 40 can be set to always be the rotation center, and when switching to north up, the center part of the display screen can be set to be the rotation center.

The display modes are not limited to north up and heading up described above, and, for example, course up, fixed point up and the like may be included.

Figure 10A:
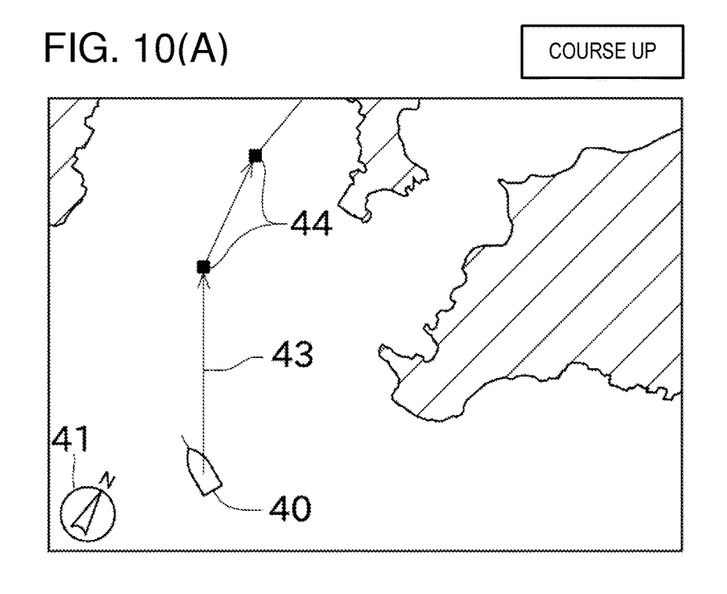
FIGS. 10(a) and 10(b) show views for describing course up and fixed point up.

Course up is a display mode in which a direction of a set course is the upward direction of the display screen. Specifically, in the display mode, as illustrated in the part (A) of FIG. 10, when a course formed by course lines 43 and waypoints (stopover points) 44 is set, the course line 43 closest to the touch panel device symbol 40 is always the upward direction.

Figure 10B:
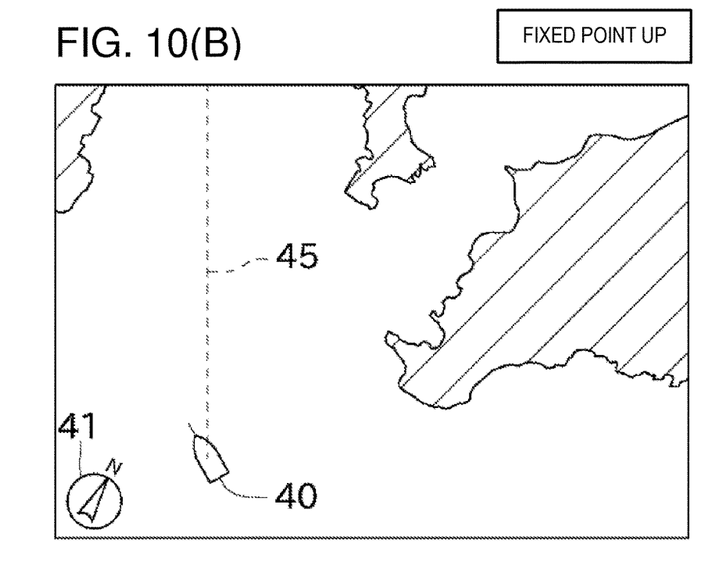

Fixed point up is a display mode in which a preset direction is the upward direction of the display screen. Specifically, in the display mode, as illustrated in the part (B) of FIG. 10, when a destination line 45 indicating the direction of a destination is displayed, the destination line 45 is always the upward direction of the display screen.

The touch panel device 11 of this embodiment is a general-purpose display device for receiving information from a plurality of sensors and displaying it; however, the present invention may be applied to display devices for mainly displaying a single kind of information (e.g., nautical chart information). For example, the present invention may also be applied to plotter devices and the like that can display nautical charts.

In the above embodiment, the two display modes are switched therebetween; however, the configuration of the present invention may be applied for a case where three or more display modes. In a case where there are three or more display modes, in order to determine which display mode to switch to when the rotating operation is detected, the following two methods can be adopted, for example.

The first method is a method in which an order is set in advance, and when the rotating operation is detected, the display mode is switched in this order. The second method is a method in which, when the rotating operation is detected, the display mode is switched to a display mode in which the rotational angle of the nautical chart becomes the smallest (the nautical chart does not have to be rotated greatly).

In the above embodiment, the touch panel device that can display the nautical chart is described as an example; however, it may be touch panel devices installed in automobiles, aircrafts and the like, which can display maps (road maps).

DESCRIPTION OF REFERENCE NUMERAL(S)

1 Ship Instrument Network System
10 Ship Network
11 Touch Panel Device (Information Display Device)
12 GPS Antenna (GNSS Sensor)
13 Radar Antenna
14 Fishfinder
15 Heading Sensor
16 Autopilot Device
21 Display Unit
22 User Interface
23 Memory
24 Detector
25 Controller
40 Touch Panel Device Symbol
41 Compass Part
42 Rotation Center Symbol

What is claimed is:

1. An information display device, comprising:
a display screen configured to display, on the display screen, a nautical chart and an information display device symbol indicating a position of the information display device on the nautical chart, the information display device being arranged on a ship;
a touch detector configured to detect rotating operation and pinch operation, the rotating operation being touch operation in which a position of one of a touch on the information display device symbol and a touch on other than the information display device symbol is rotated centering on a position of the other touch over a predetermined angle without changing the position of the other touch, the pinch operation being touch operation in which at least one of the two touches on the display screen is separated from or brought closer to the other touch; and
a controller having a processor, the controller configured, when the touch detector detects the rotating operation, to switch a display mode to a different display mode in which a reference azimuth defining a displaying orientation of the nautical chart is different, and when the touch on the information display device symbol is detected, not to perform processing that is associated with the pinch operation even in a case where the touch detector detects the pinch operation.

2. The information display device of claim 1, wherein when the touch detector detects the rotating operation, the controller switches to the different display mode by rotating the nautical chart in the same direction as a rotating direction of the rotating operation.

3. The information display device of claim 2, wherein the controller switches to the different display mode by rotating the nautical chart centering on the position of the information display device symbol.

4. The information display device of claim 2, wherein the controller switches to the different display mode by rotating the nautical chart centering on a center part of the display screen.

5. The information display device of claim 2, wherein when the information display device symbol is touched, the controller displays a rotational center of the nautical chart used when switching to the different display mode.

6. The information display device of claim 1, wherein the display mode includes at least one of north up in which the north direction is an upward direction of the display screen, head up in which a direction to which the information display device is oriented is the upward direction of the display screen, course up in which a direction of a set course is the upward direction of the display screen, and a fixed point mode in which a direction set in advance is the upward direction of the display screen.

7. The information display device of claim 1, wherein the rotating operation is the touch operation in which while the information display device symbol is touched, the position of the touch on other than the information display device symbol is rotated centering on the information display device symbol over the predetermined angle.

8. The information display device of claim 1, wherein the rotating operation is the touch operation in which while other than the information display device symbol is touched, the position of the touch on the information display device symbol is rotated centering on the position of the touch on other than the information display device symbol over the predetermined angle.

9. An information display device, comprising:
a display screen configured to display, on the display screen, a nautical chart and an information display device symbol indicating a position of the information display device on the nautical chart, the information display device being arranged on a ship;
a touch detector configured to detect rotating operation that is touch operation in which a position of one of a touch on the information display device symbol and a touch on other than the information display device symbol is rotated centering on a position of the other touch over a predetermined angle without changing the position of the other touch; and
a controller having a processor, the controller configured, when the touch detector detects the rotating operation, to switch a display mode to a different display mode, in which a reference azimuth defining a displaying orientation of the nautical chart is different.

10. The information display device of claim 9, wherein the touch detector is able to detect the pinch operation that is touch operation in which at least one of the two touches on the display screen is separated from or brought closer to the other touch.

11. The information display device of claim 9, wherein when the touch detector detects the rotating operation, the controller switches to the different display mode by rotating the nautical chart in the same direction as a rotating direction of the rotating operation.

12. The information display device of claim 11, wherein the controller switches to the different display mode by rotating the nautical chart centering on the position of the information display device symbol.

13. The information display device of claim 11, wherein the controller switches to the different display mode by rotating the nautical chart centering on a center part of the display screen.

14. The information display device of claim 9, wherein when the information display device symbol is touched, the controller displays a rotational center of the nautical chart used when switching to the different display mode.

15. The information display device of claim 9, wherein the display mode includes at least one of north up in which the north direction is an upward direction of the display screen, head up in which a direction to which the information display device is oriented is the upward direction of the display screen, course up in which a direction of a set course is the upward direction of the display screen, and a fixed point mode in which a direction set in advance is the upward direction of the display screen.

16. The information display device of claim 9, wherein the rotating operation is the touch operation in which while the information display device symbol is touched, the position of the touch on other than the information display device symbol is rotated centering on the information display device symbol over the predetermined angle.

17. The information display device of claim 9, wherein the rotating operation is the touch operation in which while other than the information display device symbol is touched, the position of the touch on the information display device symbol is rotated centering on the position of the touch on other than the information display device symbol over the predetermined angle.

18. A method of switching a display mode, comprising:
displaying, on a display screen, a nautical chart and an information display device symbol indicating a position of the information display device on the nautical chart, the information display device being arranged on a ship;
detecting rotating operation that is touch operation in which a position of one of a touch on the information display device symbol and a touch on other than the information display device symbol is rotated centering on a position of the other touch over a predetermined angle without changing the position of the other touch; and
switching the display mode to a different display mode in which a reference azimuth defining a displaying orientation of the nautical chart is different, when the rotating operation is detected by the detecting the rotating operation.

* * * * *